(12) United States Patent
Wexler et al.

(10) Patent No.: US 6,499,088 B1
(45) Date of Patent: *Dec. 24, 2002

(54) METHODS AND APPARATUS FOR POPULATING A NETWORK CACHE

(75) Inventors: Marvin Wexler, Fremont, CA (US); Sunil Gaitonde, Burr Ridge, IL (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/901,971

(22) Filed: Jul. 9, 2001

Related U.S. Application Data

(63) Continuation of application No. 09/153,785, filed on Sep. 19, 1998, now Pat. No. 6,286,084.

(51) Int. Cl.[7] ............................................. G06F 12/00
(52) U.S. Cl. ..................... 711/152; 711/130; 711/136; 709/224; 709/225; 709/212; 709/216
(58) Field of Search ............................... 711/152, 136, 711/130; 709/225, 224, 216, 212; 370/118, 254

(56) References Cited

U.S. PATENT DOCUMENTS

| | | | | |
|---|---|---|---|---|
| 4,686,621 A | * | 8/1987 | Keeley et al. | 714/40 |
| 4,827,411 A | * | 5/1989 | Arrowood et al. | 370/254 |
| 4,965,772 A | * | 10/1990 | Daniel et al. | 704/4 |
| 5,555,244 A | | 9/1996 | Gupta et al. | 370/397 |
| 5,673,265 A | | 9/1997 | Gupta et al. | 370/432 |
| 6,035,055 A | * | 3/2000 | Wang et al. | 382/118 |
| 6,055,236 A | * | 4/2000 | Nessett et al. | 370/389 |
| 6,286,084 B1 | * | 9/2001 | Wexler et al. | 709/212 |

OTHER PUBLICATIONS

Valloppillil, Vinod, "Cache Array Routing Protocol v1.0", Oct. 20, 1997, Internet–Draft, *http://ds1.internic/net/internet–drafts/draft–vinod–carp–v1–02.txt*, pp. 1–6.

Cisco Technology, Inc., "Configuring IP Routing Protocols," Dec. 10, 1997, *http://www.cisco.com/univercd/data/doc/software/11_2/cnp1/5ciprout.htm#REF402 77*, pp. 1–6, and 120–122.

Ousterhout, John K., et al. "A Trace–Driven Analysis of the UNIX 4.2 BSD File System," Jan. 2, 1993, *Computer Science Division, Electrical Engineering and Computer Science*, University of California, Berkeley, CA, pp. 1–12.

Ousterhout, John K., et al. "Beating the I/O Bottleneck: A Case for Log–Structured File Systems," Jan. 30, 1992, *Computer Science Division, Electrical Engineering and Computer Sciences*, University of California, Berkeley, CA, pp. 1–18.

Welch, Brent, "A Comparison of the Vnode and Sprite File System Architectures," *Proceedings of the USENIX File System Workshop*, May 1992, 18 pages.

\* cited by examiner

*Primary Examiner*—Matthew Kim
*Assistant Examiner*—B. R. Peugh
(74) *Attorney, Agent, or Firm*—Beyer Weaver & Thomas

(57) ABSTRACT

Methods and apparatus for populating a network cache are described. A router associated with the cache is enabled to compile flow data relating to object traffic. The flow data are analyzed to determine a first plurality of frequently requested objects. The network cache is populated with the first plurality of frequently requested objects. Subsequent to populating the network cache, the network cache is operated in conjunction with the router to cache a second plurality of requested objects.

77 Claims, 3 Drawing Sheets

METHODS AND APPARATUS FOR POPULATING A NETWORK CACHE

CROSS-REFERENCE TO RELATED APPLICATIONS

This patent application is a continuation of prior application Ser. No. 09/153,785 Methods and Apparatus for Populating a network Cache, filed Sep. 19, 1998, now U.S. Pat. No. 6,286,084, from which priority under 35 U.S.C. §120 is claimed. The above-referenced patent application is incorporated herein by reference in its entirety and for all purposes.

BACKGROUND OF THE INVENTION

The present invention relates generally to networking technology. More specifically, the present invention relates to the caching of data objects to accelerate access to, for example, the World Wide Web. Still more specifically, the present invention provides methods and apparatus by which a network cache may be populated when initially deployed.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident daemon which then made the connection to a destination platform at the client's request. The daemon then passed information back and forth between the client and destination platforms acting as an intermediary or "proxy".

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

A similar idea led to the development of network caching systems. Network caches are employed near the router of a network to accelerate access to the Internet for the client machines on the network. An example of such a system is described in commonly assigned, copending U.S. patent application Ser. No. 08/946,867 for METHOD AND APPARATUS FOR FACILITATING NETWORK DATA TRANSMISSIONS filed on Oct. 8, 1997, the entire specification of which is incorporated herein by reference for all purposes. Such a cache typically stores the data objects which are most frequently requested by the network users and which do not change too often. Network caches can provide a significant improvement in the time required to download objects to the individual machines, especially where the user group is relatively homogenous with regard to the type of content being requested. The efficiency of a particular caching system is represented by a metric called the "hit ratio" which is a ratio of the number of requests for content satisfied by the cache to the total number of requests for content made by the users of the various client machines on the network. The hit ratio of a caching system is high if its "working set", i.e., the set of objects stored in the cache, closely resembles the content currently being requested by the user group.

Unfortunately, with currently available caching systems, the performance improvement promised by providers of such systems is not immediate due to the fact that when a cache is initially connected to a router it is unpopulated, i.e., empty. Given the size of the typical cache, e.g., >20 gigabytes, and depending upon the frequency of Internet access of a given user group, it can take several days for a cache to be populated to a level at which an improvement in access time becomes apparent. In fact, while the cache is being populated additional latency is introduced due to the detour through the cache.

From the customer's perspective, this apparent lack of results in the first few days after installing a caching system can be frustrating and often leads to the assumption that the technology is not operating correctly. To address this problem, providers of caching systems have attempted to populate the cache before bringing the system on line by using previous caching logs, i.e., "squid" logs, to develop the working set for the system. However, this presents the classic "chicken and egg" conundrum in that the first time a caching system is deployed for a particular network there are no previous caching logs for that network.

Another method of populating a caching system employs a web scavenging robot which polls the client machines on the network to determine what content has been previously requested. Unfortunately, this can be a relatively slow process which consumes network resources to an undesirable degree. This process also requires a good knowledge of what type of content the users of interest typically browse.

It is therefore apparent that there is a need for techniques by which caching systems may be quickly and transparently populated when they are initially deployed.

SUMMARY OF THE INVENTION

According to the present invention, methods and apparatus are provided by which a caching system may be populated quickly before its deployment. The techniques described herein employ a capability inherent in most routers to develop a working set of data objects which are then retrieved to populate the cache. The router to which the caching system is to be connected is configured to log information regarding the destinations from which network users are requesting information, i.e., net flow statistics. According to a specific embodiment, this information is then parsed to get a list of destinations corresponding to a specific port, e.g., port 80, or a group of IP addresses. These destinations are then sorted according to the frequency with which they are requested. The top N destinations are then selected for populating the cache. Cacheable objects from those destinations are then retrieved and stored in the cache. The process of retrieving and storing this data takes only a few hours. Moreover, a system administrator can configure the network router to collect the necessary traffic flow data in advance of purchasing the caching system so that, once the system is delivered, it can be populated and deployed immediately.

According to another embodiment, before beginning operation as a cache, the caching system automatically configures the router to log the traffic flow data after which it analyzes the data and retrieves the appropriate data objects. Once populated it enables itself to perform the caching function.

Thus, the present invention provides methods and apparatus for populating a network cache. A router associated with the cache is enabled to compile flow data relating to object traffic. The flow data are analyzed to determine a first plurality of frequently requested objects. The network cache is populated with the first plurality of frequently requested objects. Subsequent to populating the network cache, the network cache is operated in conjunction with the router to cache a second plurality of requested objects.

A further understanding of the nature and advantages of the present invention may be realized by reference to the remaining portions of the specification and the drawings.

DESCRIPTION OF SPECIFIC EMBODIMENTS

Figure 1:
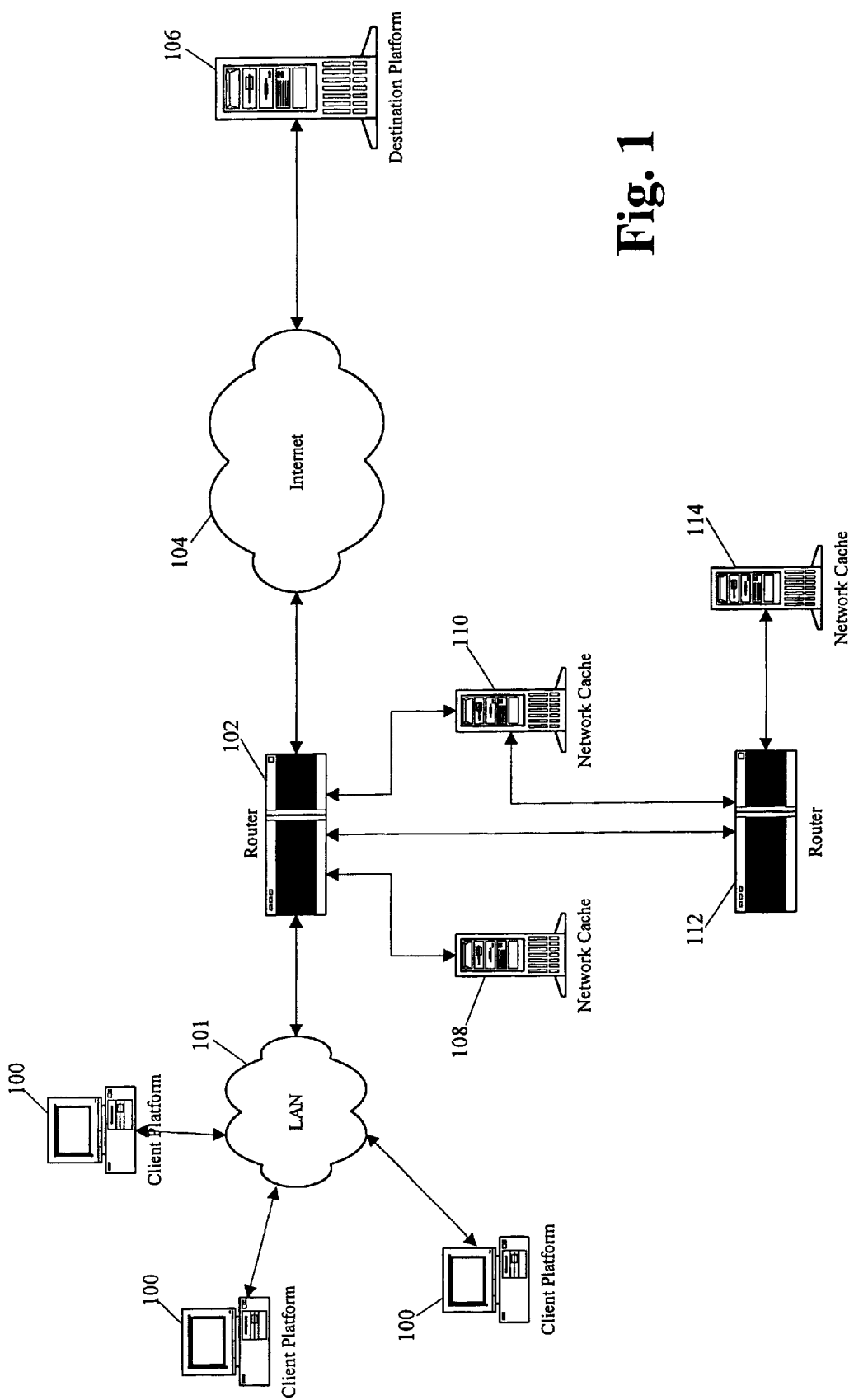
FIG. 1 is a diagram of a hardware environment according to a specific embodiment of the invention.

FIG. 1 shows a hardware environment in which the present invention may be implemented. A plurality of client platforms 100 are interconnected via LAN 101. LAN 101 is connected to router 102 which is connected via network 104 to destination platform 106. It will be assumed for the purposes of this discussion that client platforms 100 are single personal computers or work stations, that router 102 connects platform 100 to the Internet, i.e., network 104, and that destination platform 106 is a server on the World Wide Web. It should be noted, however, that a variety of configurations similar to this simple model may be employed without departing from the scope of the invention. For example, client platforms 100 could be connected via a wide area network. Router 102 could be an internal router in a LAN or a WAN (e.g., an intranet connection to an internal web page), the network's general gateway to the Internet, a direct connection to destination platform 106, or some intermediate platform between the network and destination platform 106. The connection between router 102 and client platforms 100 could include several intervening routers. Network 104 could represent a local or wide area network which includes client platforms 100 and router 102, or the Internet. Destination platform 106 could be part of the local or wide area network, or a remote server on the Internet. Referring back to FIG. 1, network caches 108 and 110 are connected to router 102. Additional router 112 is connected to router 102 and has an additional network cache 114 connected thereto. It will be understood that the network caches described herein may employ any of a variety of existing file systems and remain within the scope of the invention. For example, the invention may be implemented using a Unix general purpose file system or the equivalent. A particular embodiment of the invention employs the file system described in commonly assigned, copending U.S. patent application Ser. No. 08/937,966 for CACHE MEMORY FILE SYSTEM filed on Sep. 25, 1997, the entire specification of which is incorporated herein by reference for all purposes.

During normal operation, i.e., once the caches are populated, a client platform 100 transmits a request to retrieve data such as, for example, a multimedia object from destination platform 106. Cache-enable router 102 receives the request in the form of at least one data packet. Router 102 reads the packet header to determine whether, for example, it is a TCP packet and indicates port 80 as its destination port. If the packet is of a different protocol or is not destined for the World Wide Web, the packet is simply passed through the router and routed according to standard Internet protocols.

If, on the other hand, the packet is TCP and port 80 is specified, router 102 determines to which of its associated network caches (108 and 110) it will redirect the packet based on the destination IP address specified in the packet. Before sending the packet to one of its associated network caches, router 102 encapsulates the packet for transmission to the selected network cache by adding another TCP/IP header which designates the router as the source of the packet and the network cache as the destination. That is, the router encapsulates the packet for transmission to a network cache which might be several "hops" away. So, for example, router 102 might encapsulate the packet for transmission to network cache 114 which is connected to router 102 via router 112. Thus, not only may multiple network caches be associated with a particular router, but multiple routers may be supported by an individual network cache or a group of network caches. This allows a tremendous amount of flexibility in where the network cache and router need to be in relation to each other.

Router 102 opens a TCP connection between the client and the selected network cache and transmits the encapsulated packet to the network cache. The network cache determines if it has the requested object stored locally by comparing the packet URL to its directory. If the object is not in the cache, the network cache makes its own request for the object (using its own address as the source IP address) to destination platform 106 via router 102. That is, router 102 establishes a TCP connection between the network cache and destination platform 106. The router sees that the new request is from the network cache (by looking at the source address) and thereby knows not to redirect the packet to the network cache. This request and the subsequent retrieval of the object from destination platform 106 is done according to standard TCP/IP protocols. The retrieved object is then placed in the memory of the network cache and transmitted to client platform 100. If, on the other hand, the object is determined to be locally stored in the network cache, it is transmitted to client platform 100.

Figure 2:
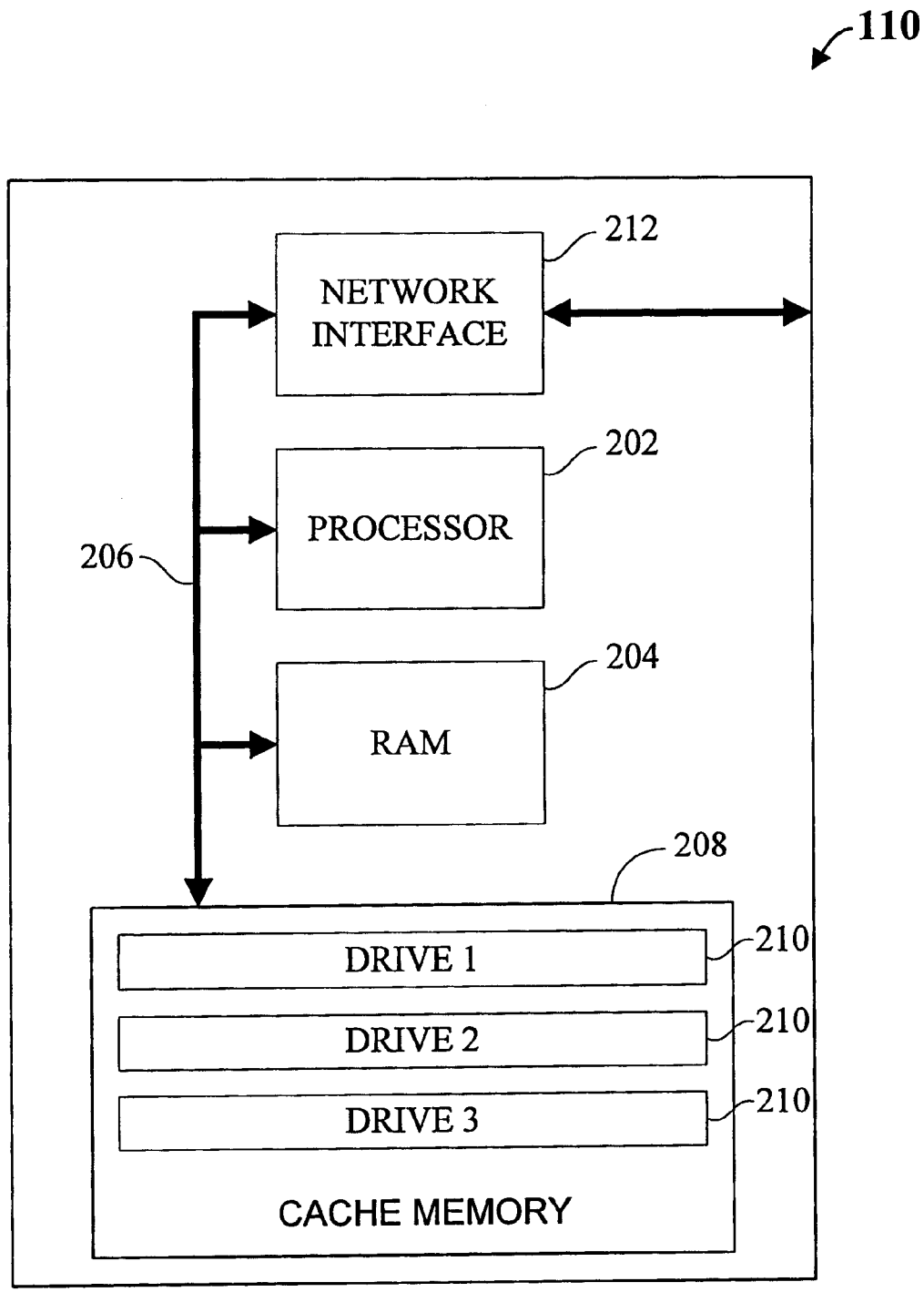
FIG. 2 is a block diagram of a caching system according to a specific embodiment of the invention.

FIG. 2 is a block diagram of a network cache such as, for example, cache 110 of FIG. 1. A central processor 202 controls operation of cache 110 and its various subsystems using system memory 204 and bus 206. Data objects are stored in cache memory 208 which, in a specific embodiment, comprises three SCSI drives 210. A network interface 212 enables communication with external devices. Portions of SCSI drives 210 may also be employed for other purposes such as, for example, storing operating and file systems for cache 110, or storing software code for directing the operation of various functionalities of cache 110. It will be understood that the cache architecture shown in FIG. 2 is merely illustrative and should not be construed to limit the scope of the present invention. That is, any of a wide variety of cache architectures may be employed to implement the present invention.

Figure 3:
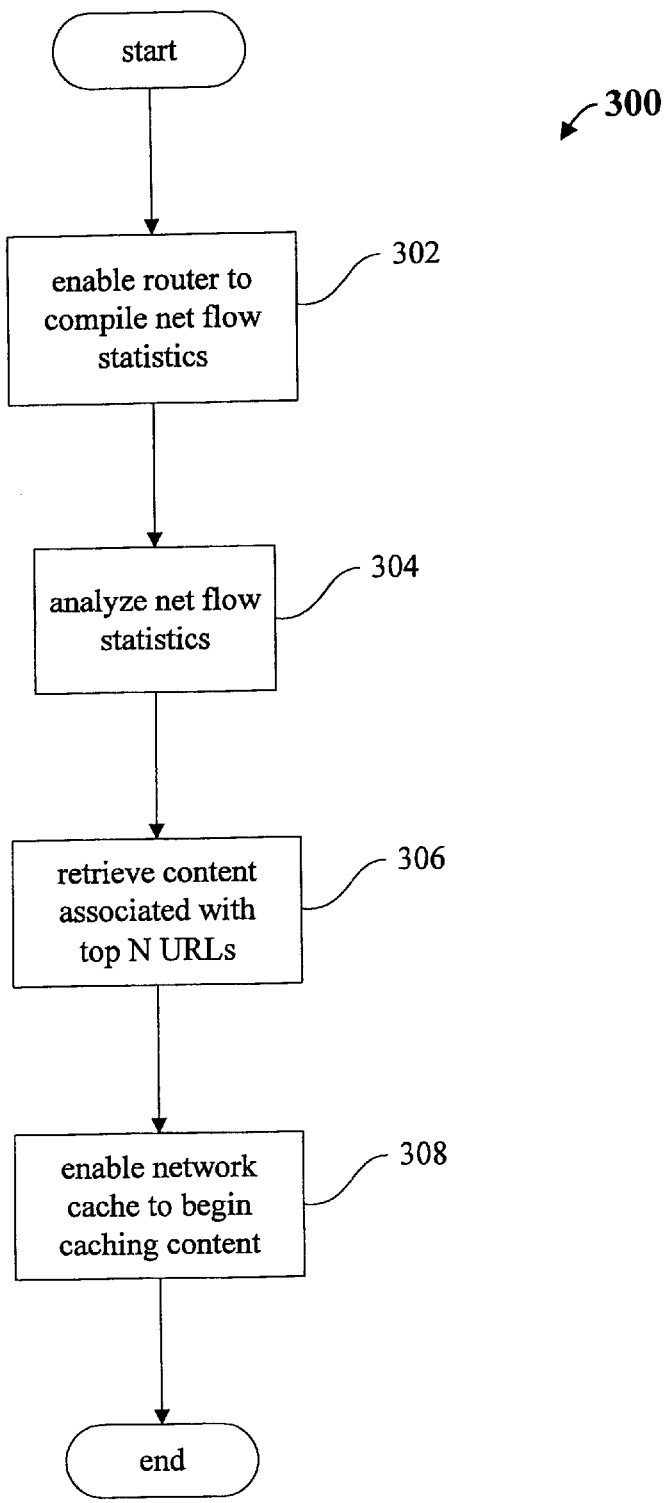
FIG. 3 is a flowchart illustrating population of a network cache according to a specific embodiment of the invention.

FIG. 3 is a flowchart 300 illustrating population of a network cache according to a specific embodiment of the invention. For illustrative purposes, reference will be made to the devices of FIG. 1 in the description of the technique represented by FIG. 3. However, it will be understood that the described technique may be employed with any of a variety of hardware configurations. Initially, router 102 is enabled to compile net flow statistics representing data traffic flow (302). Virtually all currently available or operating routers have this or some equivalent capability. The enablement of this feature may be accomplished manually by the system administrator. It may alternatively be accomplished, according to a specific embodiment of the invention, by network cache 110. That is, network cache 110 may be configured to remotely enable the router's net flow statistics capability when network cache is initially connected to router 102.

The net flow statistics being logged typically comprise information stored in the http headers of packets being handled by router 102. This header information identifies the source IP address and port and the destination IP address and port. Router 102 may be configured to compile data only with regard to packets headed for specific destination ports such as, for example, port 80 which represents the World Wide Web. Other ports such as, for example, 8001, 8002, and 8080, as well as various combinations of ports may also be specified. These statistics are compiled for a long enough period of time to ensure identification of enough content to appropriately populate the cache. This may be on the order of one to several days.

The net flow statistics are then analyzed (304) to determine the top N URLs requested by the users on LAN 101. The number N may be related to the percentage of disk space in memory 208 which is desirable to populate initially as well as the number of levels of data to be retrieved for a given URL. These programmable parameters may be manipulated by the system administrator to achieve effective operation of cache 110. The point of effective operation may vary widely depending upon the particular user group. In most cases, populating the cache to 100% is inadvisable in that data objects will almost certainly be overwritten during the first few minutes of operation. In any case, the population percentage should be set to ensure a reasonable working set which represents the statistical request activity of the user group.

Content associated with the top N URLs is then retrieved and used to populate memory 208 of cache 110 (306). Where port 80 has been specified as the port of interest, this comprises fetching at least the index.htm page associated with each of the top N sites. As mentioned above, the number of additional pages to be fetched for a particular site may be set by the program administrator to a number of levels appropriate for the user group. Alternatively, the number of additional pages fetched may be determined using any of a wide variety of heuristic prefetching algorithms such as those currently employed by browsers to determine how much additional content to prefetch when a user requests content from a particular URL.

According to one embodiment of the invention in which the compilation of net flow statistics is enabled manually by the system administrator, cache 110 may be populated by connecting it to LAN 101 and feeding it the net flow statistics for analysis and subsequent content retrieval. Cache 110 is then connected to router 102. This allows the system administrator a great deal of flexibility in the manner in which the caching system is deployed.

Analysis of net flow data and population of cache 110 may also occur with cache 110 connected to router 102. According to one embodiment and as described above, cache 110 enables the net flow statistics function in router 102, is analyzes the compiled data, and then retrieves the appropriate content under the control of resident software. Such an embodiment is desirable in terms of its transparency to the system administrator and user group.

Once cache 110 is appropriately populated its caching function is enabled (308). This may be done automatically, i.e., cache 110 may turn itself on when it determines the specified level of cache population has been reached. This type of enablement is envisioned, for example, where, as mentioned above, software resident in the cache directs the population technique described herein. Alternatively, the system administrator may connect the cache and turn it on once satisfied with the level of population. Cache 110 may then begin to cache data objects in the manner described above with reference to FIG. 1. Moreover, because cache 110 has been populated with content frequently requested by the users on LAN 101, an immediate improvement in data acquisition is seen by those users.

While the invention has been particularly shown and described with reference to specific embodiments thereof, it will be understood by those skilled in the art that changes in the form and details of the disclosed embodiments may be made without departing from the spirit or scope of the invention. For example, the invention has been described with reference to the population of a cache with content from port 80. It will be understood, however, that other criteria may be employed to provide improved access to other types of remote content. For example, a different port or a combination of ports may be selected. Specific destination addresses or groups of addresses may also be specified. Moreover, rather than specifying a percentage of disk space to which the cache should be populated, the system administrator may simply specify population of the cache with content from a specific number of the most frequently requested sites. Therefore, the scope of the invention should be determined with reference to the appended claims.

What is claimed is:

1. A method for populating a network cache associated with a network node, the method comprising:
    characterizing traffic flow associated with a network node;
    providing traffic flow information to a network cache prior to enabling the network cache to respond to client requests, wherein the network cache is populated by using traffic flow information.

2. The method of claim 1, further comprising:
enabling the network cache to respond to client requests after the network cache is populated.

3. The method of claim 2, wherein the network cache is enabled after a predetermined percentage of the network cache is populated.

4. The method of claim 3, wherein the network cache enables itself after a predetermined percentage of the network cache is populated.

5. The method of claim 1, wherein traffic flow information comprises net flow statistics.

6. The method of claim 1, wherein the network node is a router.

7. The method of claim 1, wherein the network cache is populated with a predetermined number of frequently requested objects.

8. A computer readable medium comprising computer code for populating a network cache associated with a network node, the computer readable medium comprising:
computer code for characterizing traffic flow associated with a network node;
computer code for providing traffic flow information to a network cache prior to enabling the network cache to respond to client requests, wherein the network cache is populated by using traffic flow information.

9. The computer readable medium of claim 8, further comprising:
computer code for enabling the network cache to respond to client requests after the network cache is populated.

10. The computer readable medium of claim 9, wherein the network cache is enabled after a predetermined percentage of the network cache is populated.

11. The computer readable medium of claim 8, wherein traffic flow information comprises net flow statistics.

12. The computer readable medium of claim 8, wherein the network cache is populated with frequently requested objects.

13. The computer readable medium of claim 8, wherein the network cache is populated with a predetermined number of frequently requested objects.

14. The computer readable medium of claim 13, wherein the network cache enables itself after a predetermined percentage of the network cache is populated.

15. A network node for populating a network cache associated with the network node, the network node comprising:
means for characterizing traffic flow associated with a network node;
means for providing traffic flow information to a network cache prior to enabling the network cache to respond to client requests, wherein the network cache is populated by using traffic flow information.

16. The network node of claim 15, further comprising:
means for enabling the network cache to respond to client requests after the network cache is populated.

17. The network node of claim 16, wherein the network cache is enabled after a predetermined percentage of the network cache is populated.

18. The network node of claim 17, wherein the network cache enables itself after a predetermined percentage of the network cache is populated.

19. The network node of claim 15, wherein traffic flow information comprises net flow statistics.

20. The network node of claim 15, wherein the network cache is populated with frequently requested objects.

21. The network node of claim 15, wherein the network cache is populated with a predetermined number of frequently requested objects.

22. A network node for populating a network cache associated with the network node, the network node comprising:
memory;
a processor coupled to memory, the processor configured to characterize traffic flow associated with a network node;
an output interface coupled to the processor, the output interface configured to provide traffic flow information to a network cache before the network cache is enabled to respond to client requests, wherein the network cache is populated by using traffic flow information.

23. The network node of claim 22, wherein the output interface is further configured to send client requests to the network cache after the network cache is populated and enabled.

24. The network node of claim 23, wherein the network cache is enabled after a predetermined percentage of the network cache is populated.

25. The network node of claim 24, wherein the network cache enables itself after a predetermined percentage of the network cache is populated.

26. The network node of claim 22, wherein traffic flow information comprises net flow statistics.

27. The network node of claim 22, wherein the network cache is populated with frequently requested objects.

28. The network node of claim 22, wherein the network cache is populated with a predetermined number of frequently requested objects.

29. A method for populating a network cache associated with a network node, the method comprising:
receiving at a network cache net flow information from a network node, the net flow information associated with traffic flow through the network node;
populating the network cache using net flow information, wherein the network cache is populated prior to enabling network cache processing of client requests.

30. The method of claim 29, further comprising:
enabling network cache processing of client requests after the network cache is populated with a plurality of objects.

31. The method of claim 30, wherein the network cache is enabled after a predetermined percentage of the network cache is populated.

32. The method of claim 31, wherein the network cache enables itself after a predetermined percentage of the network cache is populated.

33. The method of claim 29, wherein net flow information comprises net flow statistics.

34. The method of claim 29, wherein the network node is a router.

35. The method of claim 29, wherein the network cache is populated with a predetermined number of frequently requested objects.

36. A computer readable medium comprising computer code for populating a network cache associated with a network node, the computer readable medium comprising:
computer code for receiving at a network cache net flow information from a network node, the net flow information associated with traffic flow through the network node;
computer code for populating the network cache using net flow information, wherein the network cache is populated prior to enabling network cache processing of client requests.

37. The computer readable medium of claim 36, further comprising:

computer code for enabling network cache processing of client requests after the network cache is populated with a plurality of objects.

38. The computer readable medium of claim 37, wherein the network cache is enabled after a predetermined percentage of the network cache is populated.

39. The computer readable medium of claim 38, wherein the network cache enables itself after a predetermined percentage of the network cache is populated.

40. The computer readable medium of claim 36, wherein net flow information comprises net flow statistics.

41. The computer readable medium of claim 36, wherein the network cache is populated with frequently requested objects.

42. The computer readable medium of claim 36, wherein the network cache is populated with a predetermined number of frequently requested objects.

43. A network cache associated with a network node, the network cache comprising:
  means for receiving at a network cache net flow information from a network node, the net flow information associated with traffic flow through the network node;
  means for populating the network cache using net flow information, wherein the network cache is populated prior to enabling network cache processing of client requests.

44. The network cache of claim 43, further comprising:
  means for enabling network cache processing of client requests after the network cache is populated with a plurality of objects.

45. The network cache of claim 44, wherein the network cache is enabled after a predetermined percentage of the network cache is populated.

46. The network cache of claim 45, wherein the network cache enables itself after a predetermined percentage of the network cache is populated.

47. The network cache of claim 43, wherein net flow information comprises net flow statistics.

48. The network cache of claim 43, wherein the network cache is populated with frequently requested objects.

49. The network cache of claim 43, wherein the network cache is populated with a predetermined number of frequently requested objects.

50. A network cache associated with a network node, the network cache comprising:
  memory;
  an input interface, the input interface configured to receive net flow information from a network node, the net flow information associated with traffic flow through the network node;
  a processor coupled to the input interface and to memory, the processor configured to populate the memory using net flow information, wherein the memory is populated prior to enabling network cache processing of client requests.

51. The network cache of claim 50, wherein the processor is further configured to enable network cache processing of client requests after the memory is populated with a plurality of objects.

52. The network cache of claim 51, wherein the network cache is enabled after a predetermined percentage of the network cache is populated.

53. The network cache of claim 52, wherein the network cache enables itself after a predetermined percentage of the network cache is populated.

54. The network cache of claim 50, wherein net flow information comprises net flow statistics.

55. The network cache of claim 50, wherein the network cache is populated with frequently requested objects.

56. The network cache of claim 50, wherein the network cache is populated with a predetermined number of frequently requested objects.

57. A network environment having a network cache associated with a router, the network environment comprising:
  means for compiling flow data relating to object traffic;
  means for analyzing the flow data to determine a first plurality of frequently requested objects; and
  means for populating the network cache with the first plurality of frequently requested objects prior to enabling access to a network cache in response to a client request.

58. The network environment of claim 57 wherein populating the network cache comprises retrieving the first plurality of requested objects via the router.

59. The network environment of claim 58 wherein retrieving the first plurality of requested objects comprises retrieving an index.htm page and a programmable number of lower level pages for each requested object.

60. The network environment of claim 57 wherein populating the network cache comprises retrieving the first plurality of requested objects via the router and an intervening network for which the router serves as a gateway, the network cache being connected to the router via the intervening network during population of the network cache.

61. The network environment of claim 60 wherein the network cache is connected to the router without the intervening network during caching of the second plurality of requested objects.

62. The network environment of claim 57 wherein populating the network cache comprises causing the first plurality of requested objects to occupy a configurable portion of a storage capacity of the network cache.

63. The network environment of claim 57 wherein the compiled data comprises header data from data packets.

64. A network cache associated with a router, comprising:
  cache memory;
  a central processing unit for controlling operation of the network cache; and
  a storage medium readable by the central processing unit and containing unit program instructions for populating the cache memory, the storage medium comprising:
  computer readable code for enabling the router to compile flow data relating to object traffic, analyzing the flow data to determine a first plurality of frequently requested objects, and populating the cache memory with the first plurality of frequently requested objects prior to enabling access to the network cache in response to a client request; and
  computer readable code for operating the network cache in conjunction with the router thereby caching a second plurality of requested objects after populating the network cache.

65. The network cache of claim 64 wherein populating the network cache comprises retrieving the first plurality of requested objects via the router.

66. The network cache of claim 65 wherein retrieving the first plurality of requested objects comprises retrieving an index.htm page and a programmable number of lower level pages for each requested object.

67. The network cache of claim 64 wherein populating the network cache comprises retrieving the first plurality of requested objects via the router and an intervening network for which the router serves as a gateway, the network cache being connected to the router via the intervening network during population of the network cache.

68. The network cache of claim 67 wherein the network cache is connected to the router without the intervening network during caching of the second plurality of requested objects.

69. The network cache of claim 64 wherein populating the network cache comprises causing the first plurality of requested objects to occupy a configurable portion of a storage capacity of the network cache.

70. The network cache of claim 64 wherein the compiled data comprises header data from data packets.

71. A computer readable medium containing program instructions for populating a network cache associated with a router, the computer readable medium comprising:

computer readable code for enabling the router to compile flow data relating to object traffic, analyzing the flow data to determine a first plurality of frequently requested objects, and populating the network cache with the first plurality of frequently requested objects prior to enabling access to the network cache in response to a client request;

wherein the network cache is configured to operate in conjunction with the router to cache a second plurality of requested objects subsequent to population of the network cache with the first plurality of frequently requested objects.

72. The computer readable medium of claim 71 wherein populating the network cache comprises retrieving the first plurality of requested objects via the router.

73. The computer readable medium of claim 72 wherein retrieving the first plurality of requested objects comprises retrieving an index.htm page and a programmable number of lower level pages for each requested object.

74. The computer readable medium of claim 71 wherein populating the network cache comprises retrieving the first plurality of requested objects via the router and an intervening network for which the router serves as a gateway, the network cache being connected to the router via the intervening network during population of the network cache.

75. The computer readable medium of claim 74 wherein the network cache is connected to the router without the intervening network during caching of the second plurality of requested objects.

76. The computer readable medium of claim 71 wherein populating the network cache comprises causing the first plurality of requested objects to occupy a configurable portion of a storage capacity of the network cache.

77. The computer readable medium of claim 71 wherein the compiled data comprises header data from data packets.

* * * * *